UNITED STATES PATENT OFFICE.

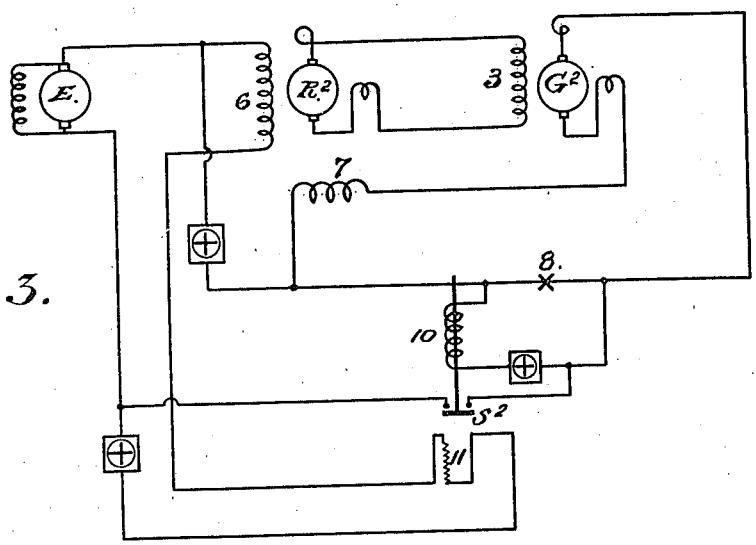
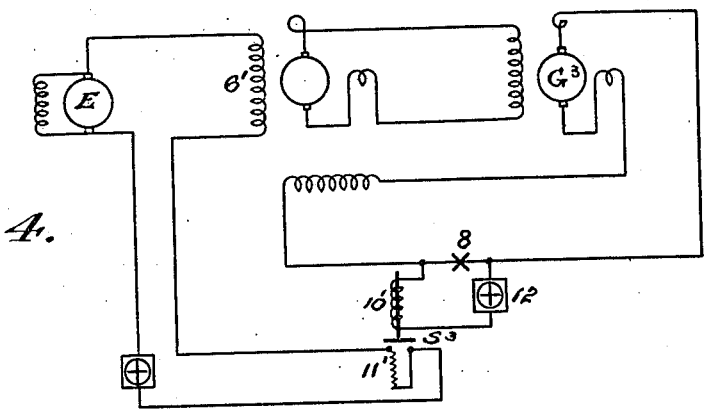
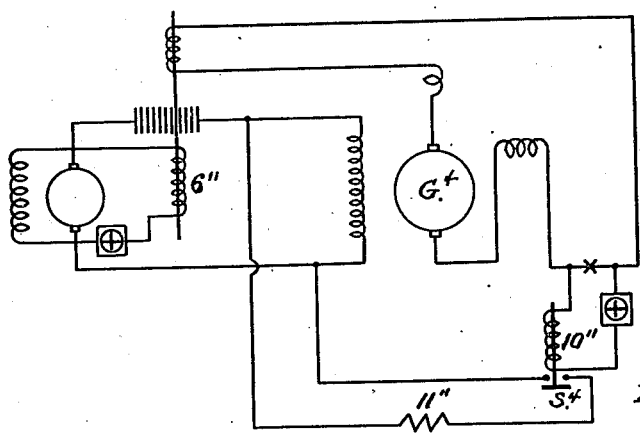

OTIS ALLEN KENYON, OF NEW YORK, N. Y.

ELECTRIC WELDING.

1,292,800. Specification of Letters Patent. Patented Jan. 28, 1919.

Application filed August 7, 1918. Serial No. 248,712.

*To all whom it may concern:*

Be it known that I, OTIS A. KENYON, a citizen of the United States, residing at New York city, in the county of New York and State of New York, have invented certain new and useful Improvements in Electric Weldings, of which the following is a specification.

My invention relates to certain new and useful improvements in arc welding and particularly to a constant-potential constant-current system and the invention consists of the parts and the constructions, arrangements and combinations of parts which I will hereinafter describe and claim.

In the accompanying drawings forming part of this specification Figures 1 to 5 inclusive illustrate more or less diagrammatically several systems of arc welding to which the present improvements are applicable.

In my prior Patent No. 1,181,227, dated May 2, 1916, I have disclosed a constant-current closed-circuit welding system and I have developed in connection with the same, automatic heat control, and improved energy economy to its practical limit. As there are certain applications where series connection of arcs cannot be used, it becomes very desirable to obtain the same favorable characteristics with a constant-potential distribution system as I have with the constant-current closed-circuit system of the aforesaid prior patent. The system disclosed in the prior patent may be used in single-arc units, and such units may be considered as serving the same purpose as a ballast resistance in an ordinary system. Such an arrangement, however, would be unnecessarily wasteful, although much more economical than the ordinary constant-potential welding system. In order to obtain all the advantages of heat control possessed by the closed-circuit, I have devised means of controlling the welding generator in conjunction with the arc, in such a way that it will supply only the amount of energy required to hold a magnetized switch in the closed position while not welding, and furnish a predetermined and adjustable welding current while welding; the change from one condition to the other is obtained automatically. In this way, the advantages of the closed-circuit system are retained, and the loss which ordinarily goes on when no welding is done, is reduced to a negligible minimum.

As before stated, the present invention is applicable to various types of welding systems and in the accompanying drawings I have shown a limited number of applications merely as illustrations of what may be done.

Figure 1:
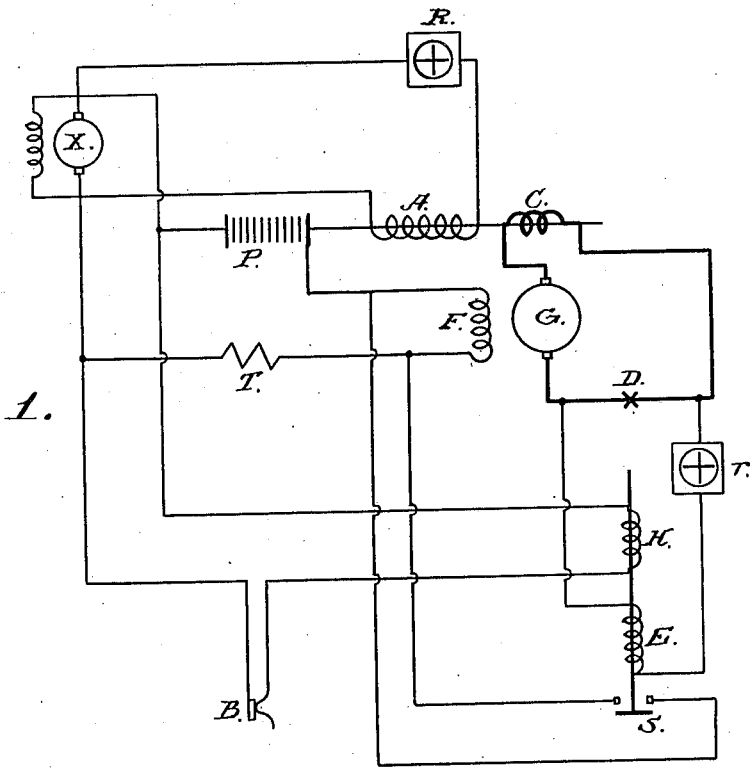

Referring to the system of Fig. 1 and which system is substantially like the one disclosed in a companion application filed of even date herewith, A and C are coils of variable resistance; B is a switch of any desired character; D represents the welding arc; E is a relay; F is a field; G is a generator; H is a short circuit coil; P is a carbon pile; R is a regulator; $r$ is a rheostat; S is a contactor; T is a resistance; and X is an exciter.

In the welding system shown in Fig. 1, the welding generator G is excited by the field F, which draws its current from the exciter X through the carbon pile P and the fixed resistance T. The resistance of the carbon pile is varied by the differential action of the coils A and C, the pile of the coil A being constant while that of the coil C is proportional to the current of that in the main circuit. The operation of this system is substantially as follows:

The switch B is normally closed, exciting the coil, H, which in turn holds the contactor S in the closed position, short-circuiting the field F. Under these conditions the terminals of the arc D are dead. When the welder is ready to begin operation, he opens the switch, P, which may conveniently be located on the handle of the welding tool, and this operation allows the contactor, S, to drop open and the full current to pass through the field, F. If the electrodes of the arc are in contact, the arc may now be drawn, and welding may be continued as long as the switch, B, is held open and the arc, D, is not drawn out sufficiently to send current through the relay, E, of such a value as to close the contactor, S. If the welder should draw too long an arc and still hold the switch B opened, the contactor would close momentarily; it would open as soon as the machine dropped its voltage and it would again close as soon as the machine picked up its voltage. This alternate opening and closing of the contactor will be maintained as long as the arc, D, was longer than the value for which the relay, E, was set; the actual value of this setting is adjusted by means of the rheostat $r$.

In the illustration given, if the welder wishes to stop without drawing the maximum length of arc, he simply releases the switch, B, allowing it to close when the coil H, will short circuit the field through contactor S.

Figure 2:
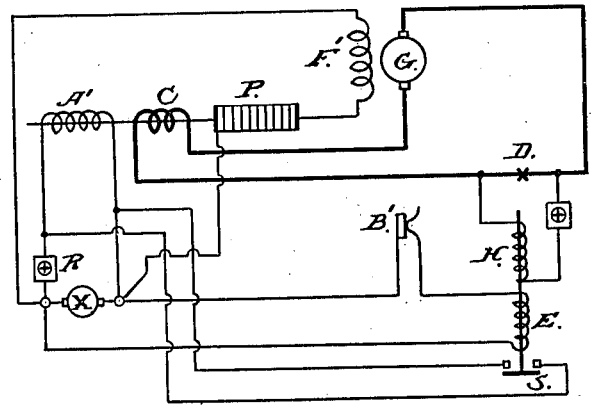

In Fig. 2, I illustrate substantially the same system of welding as heretofore described and as shown in Fig. 1, except that the field circuit, F', is opened in the carbon pile, P, by short circuiting the pressure coil, A', when the limited length of arc is exceeded or when the switch, B', is allowed to close. The result is exactly the same as in Fig. 1, except that the field, F', is killed by open-circuiting instead of short-circuiting.

In Fig. 3, I show a somewhat modified system of arc welding and one which is substantially disclosed in a companion application filed January 22, 1918, Serial Number 213,138, and in which system the present improvements are embodied. In this case the excitation winding, 3, of the generator, $G^2$ is supplied from the regulator, $R^2$, the E. M. F. of which is determined by the differential action of a separately excited winding or coil, and a reverse series winding in the main line, 7.

Reducing the field, 6, to zero will result in "killing" both the regulator, $R^2$, and the generator, $G^2$. The operation of this particular system may be briefly described as follows:

Normally when welding, the contactor, $S^2$, closes the opposing top contacts, thereby leaving the winding of the relay, 10, across the exciter line, E, in parallel with the field circuit, 6, and the very high resistance, 11. Manifestly, the same purpose would be served if the circuit were actually opened, but I prefer to insert a very high resistance, as 11, so as to avoid severe action of a complete field discharge through an arc at the break. When welding is started by bringing the terminals of the arc, 8, in contact with one another, the coil, 10, is practically short-circuited so that the contactor, $S^2$, will be moved under the influence of a spring to its lower position, where it short circuits the high resistance, 11, and allows the field circuit, 6, to be excited. This instantly builds up an arc at, 8, that may continue until said arc exceeds the limit at which the current shunted through the coil, 10, will open the contactor, $S^2$, at the bottom, and close it at the top. This leaves the field circuit dead until the electrodes are again brought together.

It will be possible that by using a holding coil as in Fig. 1, to arrange the contactor so that it will prevent the starting of an arc when the electrodes are brought together, except when such a procedure is desired, when the effect of the holding coil would be annulled.

In Fig. 4, I show substantially the same system as in Fig. 3, except that the resistance, 11', is so designed as to reduce the open circuit voltage of the generator, $G^3$, to such a value that it will just hold the contactor, $S^3$, open as long as no welding is going on, but the minute the terminals of the arc, 8, are brought together, the coil, 10' is short circuited, which allows the contactor, $S^3$, to drop and in this way restore the excitation in the winding 6'. The welding then continues until the voltage limit for which the coil, 10', is set by means of a rheostat, 12, is attained when the contactor, $S^3$, is raised, and the resistance, 11', is again inserted in series with the field winding, 6'.

The system illustrated in Fig. 5, does not depart materially from the one shown in Fig. 4, except that the contactor, $S^4$, instead of inserting a resistance in series with the winding, 6'', and thus reducing the current to a relatively low value, a resistor, 11'' of any desired character is inserted in parallel with the coil, 6''. In this way the voltage of the generator, $G^4$, may be reduced to such a value that it will just hold the contactor, $S^4$, in its upper position as long as the arc terminals are open. When they are brought together, coil 10'' is short circuited allowing the switch, $S^4$, to drop open, which removes the shunt from the field circuit and permits the generation to resume normal operation. In the same way as before described, if the predetermined length of the arc is exceeded the coil, 10'', will take sufficient current to close the circuit through the parallel resistance, 11'', and thus cut the machine down to a minimum voltage.

It will thus be seen that in the present instance I have devised a constant-potential-constant-current system which embodies an automatic heat control and improved energy economy; in other words, I obtain the same favorable characteristic with which constant-potential distribution system as I have disclosed in the constant-current closed-circuit system of my aforesaid prior patent.

Having thus described my invention what I claim as new and desire to secure by Letters Patent is:—

1. In electric welding, an electric generator having a shunt wound field circuit, in combination with a welding arc connected to the armature of said generator, and electro-responsive means for rendering the current through the excitation winding inoperative for welding, at a predetermined voltage across the arc.

2. In electric welding, an electric generator having a shunt wound field circuit, in combination with a welding arc connected to the armature of said generator, electro-responsive means for rendering the current through the excitation winding inoperative for welding, at a predetermined voltage across the arc, and means for maintaining the said winding inoperative until released.

3. In electric welding, an electric generator having a shunt wound field circuit, in combination with a welding arc connected to the armature of the generator, electro-responsive means for rendering the current through the excitation winding inoperative for welding, at a predetermined voltage through the arc, and means under control of the welder while welding to render the said winding inoperative at will.

4. In electric welding, an electric generator having a shunt wound field circuit, in combination with a welding arc connected to the armature of the generator, a coil connected in parallel with the arc and carrying current proportionate to the voltage across said arc, and means controlled by the current in said coil at a predetermined arc voltage to render the current through the excitation winding inoperative for welding.

5. In electric welding, an electric generator having a shunt wound field circuit, in combination with a welding arc connected to the armature of the generator, a coil connected in parallel with the arc and carrying current proportionate to the voltage across the arc, means controlled by the current through said coil at a predetermined arc voltage to render the current through the excitation winding inoperative for welding, and a second coil separately excited adapted to hold said winding inoperative until released.

6. In electric welding, an electric generator having a shunt wound field circuit, in combination with a welding arc connected to the armature of said generator, and electro-responsive means for stopping the current through the excitation winding at a predetermined voltage across the arc.

7. In electric welding, an electric generator having a shunt wound field circuit, in combination with a welding arc connected to the armature of said generator, and electro-responsive means for short-circuiting the excitation winding at a predetermined voltage across the arc.

8. In electric welding, an electric generator having a shunt wound field circuit, in combination with a welding arc connected to the armature of said generator, and means controlled by the voltage across the arc to short-circuit the excitation winding at a predetermined voltage across the arc.

9. In electric welding, an electric generator having a shunt wound field circuit, in combination with a welding arc connected to the armature of said generator, means controlled by the voltage across the arc to short-circuit the excitation winding at a predetermined voltage, and means for uninterruptedly maintaining the short-circuit.

10. In electric welding, an electric generator having a shunt wound field circuit, in combination with a welding arc connected to the armature of said generator, electro-responsive means for short-circuiting the excitation winding at a predetermined voltage across the arc, and means under the control of the welder while welding for short-circuiting said winding at will.

11. In electric welding, an electric generator having a shunt wound field circuit, in combination with a welding arc connected to the armature of said generator, a coil connected in parallel with the arc and carrying current proportionate to the voltage across the arc, and means controlled by the current in said coil at a predetermined voltage to short-circuit the excitation winding.

12. In electric welding, an electric generator having a shunt wound field circuit, in combination with a welding arc connected to the armature of said generator, a coil connected in parallel with the arc and carrying current proportionate to the voltage across the arc, and means controlled by current in said coil at a predetermined voltage to short-circuit the excitation winding, and a second coil separately excited adapted to hold said short-circuit until released.

13. In electric welding, an electric generator having a shunt wound field circuit, in combination with a welding arc connected to the armature of said generator, means for rendering the excitation winding inoperative for welding when the voltage across the arc reaches a predetermined limit, and means for adjusting this limit.

14. In electric welding, an electric generator having a shunt wound field circuit, in combination with a welding arc connected to the armature of said generator, a coil connected in parallel with the arc and carrying current proportionate to the voltage across the arc, means controlled by the current in said coil at a predetermined voltage for rendering the excitation winding inoperative for welding, and a rheostat in series with said coil to adjust said voltage.

In testimony whereof I affix my signature.

OTIS ALLEN KENYON.